(12) United States Patent
Yang et al.

(10) Patent No.: US 10,414,284 B2
(45) Date of Patent: Sep. 17, 2019

(54) WATER COOLED BATTERY SYSTEM WITH IMPROVED SAFETY WITH RESPECT TO AC VOLTAGE INSULATION VULNERABILITY

(71) Applicants: HYUNDAI MOTOR COMPANY, Seoul (KR); KIA MOTORS CORPORATION, Seoul (KR)

(72) Inventors: Hui Tae Yang, Seoul (KR); Jin Won Kim, Namyangju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 12 days.

(21) Appl. No.: 15/814,681

(22) Filed: Nov. 16, 2017

(65) Prior Publication Data
US 2019/0009687 A1 Jan. 10, 2019

(30) Foreign Application Priority Data

Jul. 7, 2017 (KR) .................. 10-2017-0086415

(51) Int. Cl.
*B60L 3/00* (2019.01)
*B60L 11/18* (2006.01)
(Continued)

(52) U.S. Cl.
CPC ......... *B60L 11/1861* (2013.01); *B60L 3/0069* (2013.01); *B60L 58/12* (2019.02); *B60L 58/26* (2019.02); *H01M 2/1072* (2013.01); *H01M 2/34* (2013.01); *H01M 10/482* (2013.01); *H01M 10/613* (2015.04); *H01M 10/625* (2015.04); *H01M 10/6551* (2015.04); *H01M 10/6556* (2015.04); *H01M 10/6567* (2015.04); *H01M 2200/00* (2013.01); *H01M 2220/20* (2013.01)

(58) Field of Classification Search
CPC ........................... B60L 11/1861; B60L 3/0069
USPC ....................................................... 320/152
See application file for complete search history.

(56) References Cited

U.S. PATENT DOCUMENTS

2001/0052419 A1 12/2001 Quirijnen et al.
2004/0174207 A1* 9/2004 Vandewege ............. H02H 9/08
327/544

(Continued)

FOREIGN PATENT DOCUMENTS

GB 2537431 A 10/2016
JP 2001-037068 A 2/2001
(Continued)

OTHER PUBLICATIONS

Extended European Search Report issued in Application No. 17204345.7 dated Mar. 14, 2018.
(Continued)

*Primary Examiner* — Jerry D Robbins
(74) *Attorney, Agent, or Firm* — Morgan, Lewis & Bockius LLP

(57) ABSTRACT

A battery system includes a battery module; a cooling channel disposed adjacent to the battery module; a ground wire configured to electrically connect the cooling channel and a vehicle body; and a leakage current blocking device configured to interrupt an electrical connection of the cooling channel and the vehicle body when a leakage current occurs in the battery module.

9 Claims, 5 Drawing Sheets

(51) Int. Cl.
*H01M 10/613* (2014.01)
*H01M 10/48* (2006.01)
*H01M 2/10* (2006.01)
*H01M 2/34* (2006.01)
*H01M 10/625* (2014.01)
*B60L 58/12* (2019.01)
*B60L 58/26* (2019.01)
*H01M 10/6556* (2014.01)
*H01M 10/6551* (2014.01)
*H01M 10/6567* (2014.01)

(56) References Cited

U.S. PATENT DOCUMENTS

2005/0122066 A1* 6/2005 Chou .................. H02H 1/0015
 315/307
2010/0052419 A1* 3/2010 Oosawa ............... B60L 3/0046
 307/10.1
2010/0073832 A1* 3/2010 Chung ................ H02H 1/0015
 361/42
2014/0322571 A1* 10/2014 Fabian ................ H01M 10/625
 429/82
2015/0380782 A1* 12/2015 Youngs ............... H01M 10/625
 429/72

FOREIGN PATENT DOCUMENTS

| | | |
|---|---|---|
| JP | 2010-218944 A | 9/2010 |
| KR | 10-2009-0015334 A | 2/2009 |
| KR | 10-2016-0021499 A | 2/2016 |
| KR | 10-2016-0060610 A | 5/2016 |
| KR | 10-2016-0069800 A | 6/2016 |

OTHER PUBLICATIONS

Extended European Search Report issued in European Patent Application No. 17204345.7 dated Mar. 14, 2018.

* cited by examiner

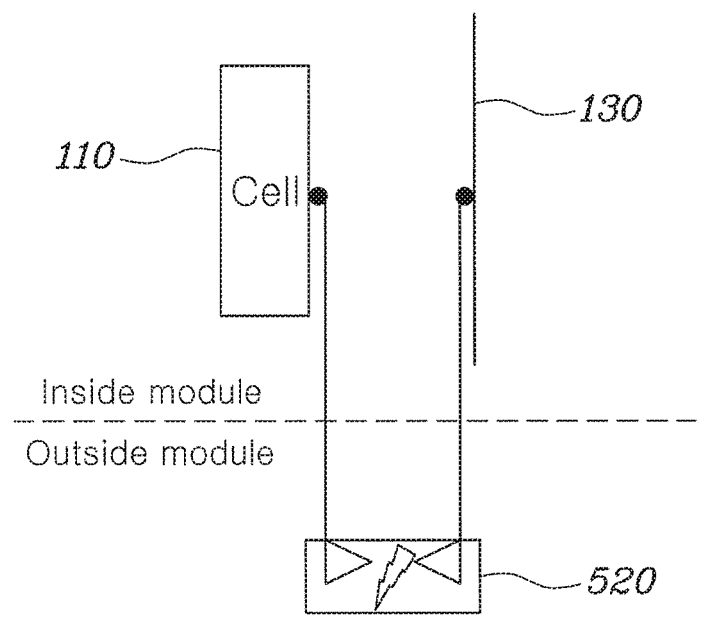

WATER COOLED BATTERY SYSTEM WITH IMPROVED SAFETY WITH RESPECT TO AC VOLTAGE INSULATION VULNERABILITY

CROSS REFERENCE TO RELATED APPLICATION

The present application claims priority to Korean Patent Application No. 10-2017-0086415, filed Jul. 7, 2017, the entire contents of which is incorporated herein for all purposes by this reference.

TECHNICAL FIELD

The present disclosure relates to a battery system and, more specifically, to a battery system, which can induce a spark to occur outside a module when a leakage current flows in a structure of a water-cooled type battery system having insulation vulnerability, and can disconnect a ground wire between a cooling channel and a vehicle body when the leakage current continuously occurs, so that the battery system has an improved insulation safety.

BACKGROUND

A water-cooled type battery system configured to cool a battery through a cooling channel may undergo breakdown of inside insulation of the battery caused by an AC voltage at the time of motor 3-phase insulation breakdown, and has a higher possibility of AC insulation breakdown than that of DC insulation breakdown. In a process of development, the water-cooled type battery system may have vulnerable AC voltage insulation although it has sufficient DC voltage insulation.

The conventional water-cooled type battery systems have a grounded cooling channel (cooling plate). Therefore, it is more difficult to ensure the insulation performance of the water-cooled type battery system than that of an air-cooled type battery system. Further, in the water-cooled type battery system, a distance between a cooling channel and a battery cell is short in order to improve the cooling performance thereof. Therefore, the water-cooled type battery system is more susceptible to explosion during cell venting than the air-cooled type battery system. Further, it is difficult to ensure the insulation of the water-cooled type battery system when a relay of a high-voltage battery thereof is in a fused state.

In order to ensure AC insulation, the water-cooled type battery system is required to have a chassis and a battery sufficiently spaced from each other. However, when the chassis and the battery are sufficiently spaced from each other, the efficiency of the water-cooled type battery system is inevitably reduced. Further, the water-cooled type battery system has an airtight structure and thus has a safety-related problem, such as explosion, which may be caused by an insulation breakdown during cell sealing release.

Therefore, there has been a necessity for a solution for solving the insulation vulnerability resulting from the above structure of the water-cooled type battery system.

The above information disclosed in this Background section is only for enhancement of understanding of the background of the present disclosure and should not be taken as acknowledgement that this information forms the prior art that is already known to a person skilled in the art.

SUMMARY

The present disclosure has been proposed to solve the above-described problems, and an aspect of the present disclosure is to provide a battery system, which can induce a spark to occur outside a module when a leakage current flows in a structure of a water-cooled type battery system having insulation vulnerability, and can disconnect a ground wire between a cooling channel and a vehicle body when the leakage current continuously occurs, so that the battery system has an improved insulation safety.

A battery system according to an exemplary embodiment of the present disclosure may include: a battery module; a cooling channel disposed adjacent to the battery module; a ground wire electrically connecting the cooling channel and a vehicle body; and a leakage current blocking device configured to interrupt an electrical connection of the cooling channel and the vehicle body when a leakage current occurs in the battery module.

The leakage current blocking device may cause an electric spark to occur by the leakage current occurring in the battery module, and may interrupt an electrical connection formed by the ground wire on the basis of the number of times of the occurrence of the electric spark.

The leakage current blocking device may include: a spark induction chamber having an inner space, in which the electric spark occurs, and having a piston which moves by the expansion of a gas in the inner space; a switch configured to be operated by the piston; and a relay configured to determine an electrical connection state of the ground wire according to an operation of the switch.

The spark induction chamber may include, in the inner space thereof, a first acicular structure electrically connected to one point inside the battery module and a second acicular structure connected to another point inside the battery module.

The first acicular structure may be connected to a battery cell inside the battery module and the second acicular structure may be connected to an inner surface of a cover of the battery module.

The first acicular structure may be connected to a battery cell inside the battery module and the second acicular structure may be connected to a cooling fin disposed between battery cells inside the battery module.

A battery system according to another exemplary embodiment of the present disclosure may include: a battery module; a cooling channel disposed adjacent to the battery module; a ground wire electrically connecting the cooling channel and a vehicle body; and a leakage current blocking device disposed outside the battery module and having a first acicular structure and a second acicular structure, which are electrically connected to two points inside the battery module, respectively, wherein a leakage current between the two points inside the battery module is configured to cause an electric spark to occur between the first and second acicular structures.

The first acicular structure may be connected to a battery cell inside the battery module and the second acicular structure may be connected to an inner surface of a cover of the battery module.

The first acicular structure may be connected to battery cells inside the battery module and the second acicular structure may be connected to a cooling fin disposed between the battery cells inside the battery module.

The leakage current blocking device further may include: a spark induction chamber having an inner space, in which the first and second acicular structures are arranged, and having a piston which moves as a gas in the inner space expands due to the occurrence of an electric spark between the first and second acicular structures; a switch configured to be operated by the piston; and a relay configured to determine an electrical connection state of the ground wire according to the operation of the switch.

A battery system according to the present disclosure can induce a spark to occur outside a module when a leakage current flows in a structure of a water-cooled type battery system having insulation vulnerability, and can disconnect a ground wire between a cooling channel and a vehicle body when the leakage current continuously occurs, so that the battery system has an improved insulation safety.

Further, the battery system can prevent the occurrence of a spark inside the module, thereby preventing cell sealing release, explosion, and fire.

Further, when the leakage current continuously occurs, the battery system can prevent the cooling channel and the vehicle body from being grounded, thereby improving insulation performance.

Further, the battery system can ensure insulation safety, thereby improving the merchantability of a vehicle.

BRIEF DESCRIPTION OF THE DRAWINGS

The above and other aspects, features and advantages of the present disclosure will be more apparent from the following detailed description taken in conjunction with the accompanying drawings, in which:

FIGS. 4A and 4B illustrate a spark induction chamber of the battery system according to an embodiment of the present disclosure.

DETAILED DESCRIPTION

Hereinafter, a battery system according to various embodiments of the present disclosure will be described with reference to the accompanying drawings.

Figure 1:
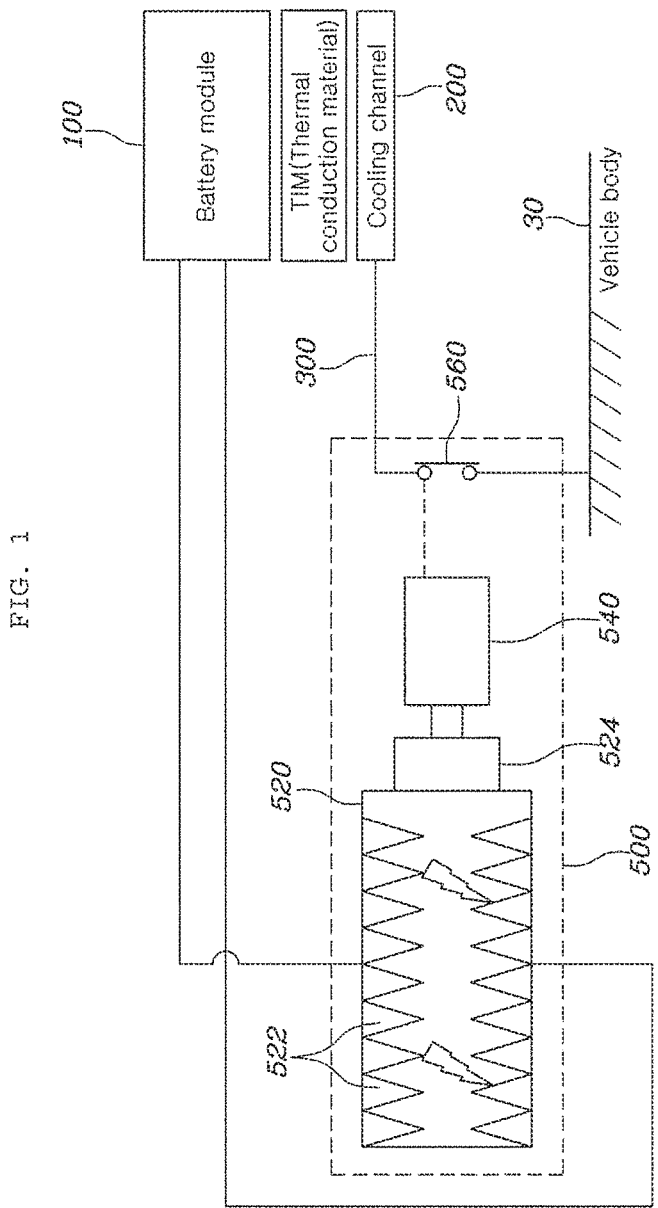
FIG. 1 illustrates the configuration of a battery system according to an embodiment of the present disclosure.
Figure 2:
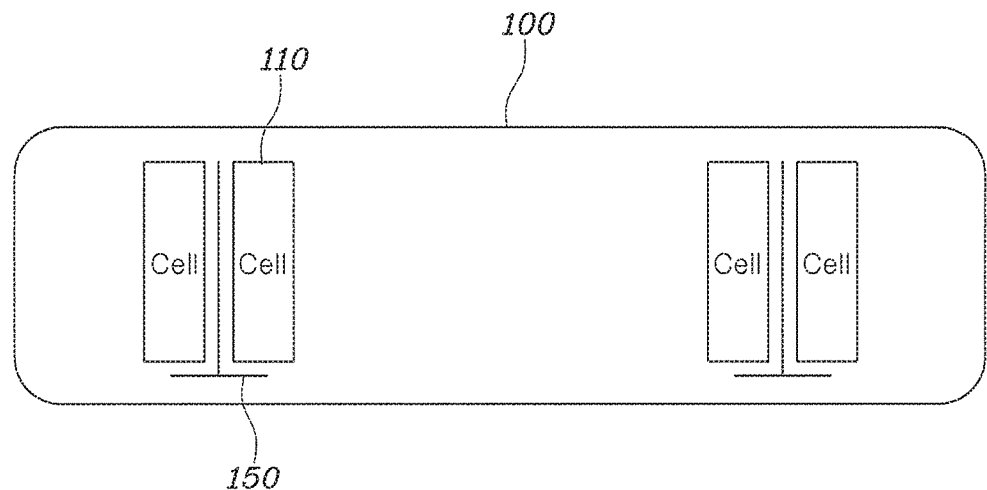
FIG. 2 illustrates a battery module of the battery system according to an embodiment of the present disclosure.
Figure 3:
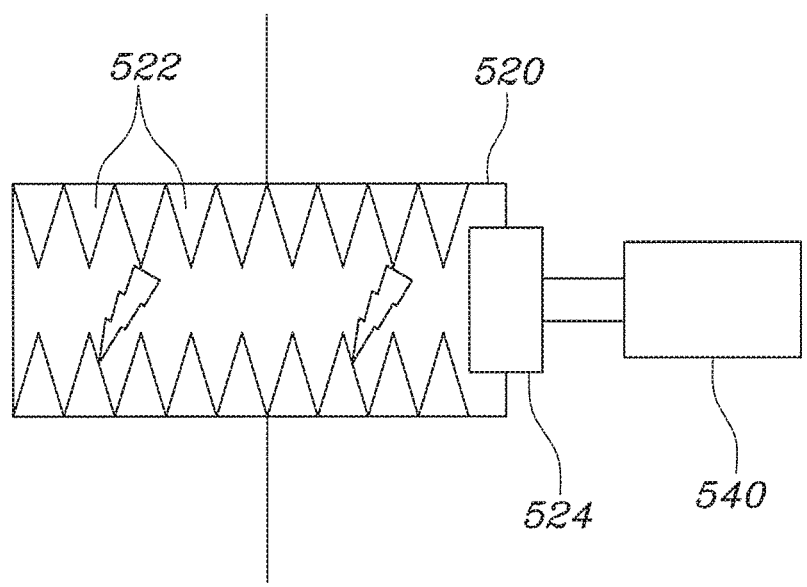
FIG. 3 illustrates the configuration of a leakage current blocking device of the battery system according to an embodiment of the present disclosure.
Figure 4B:
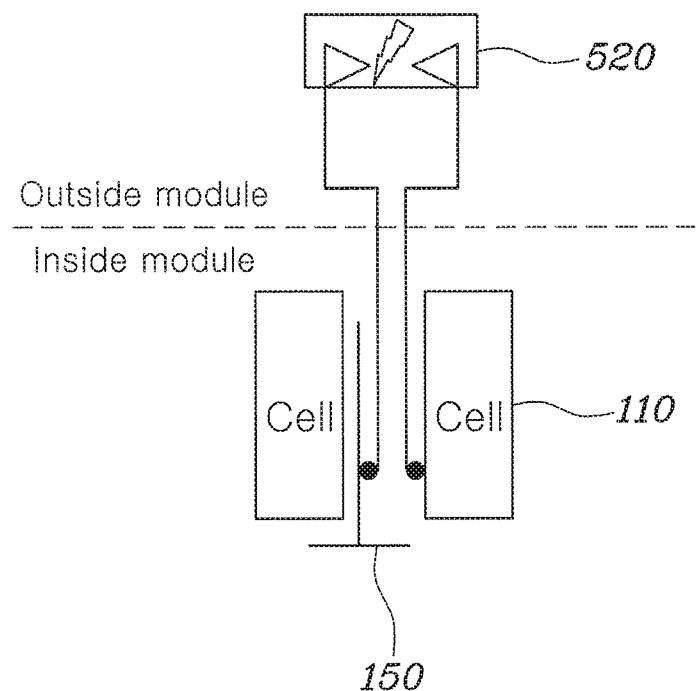
Figure 5:
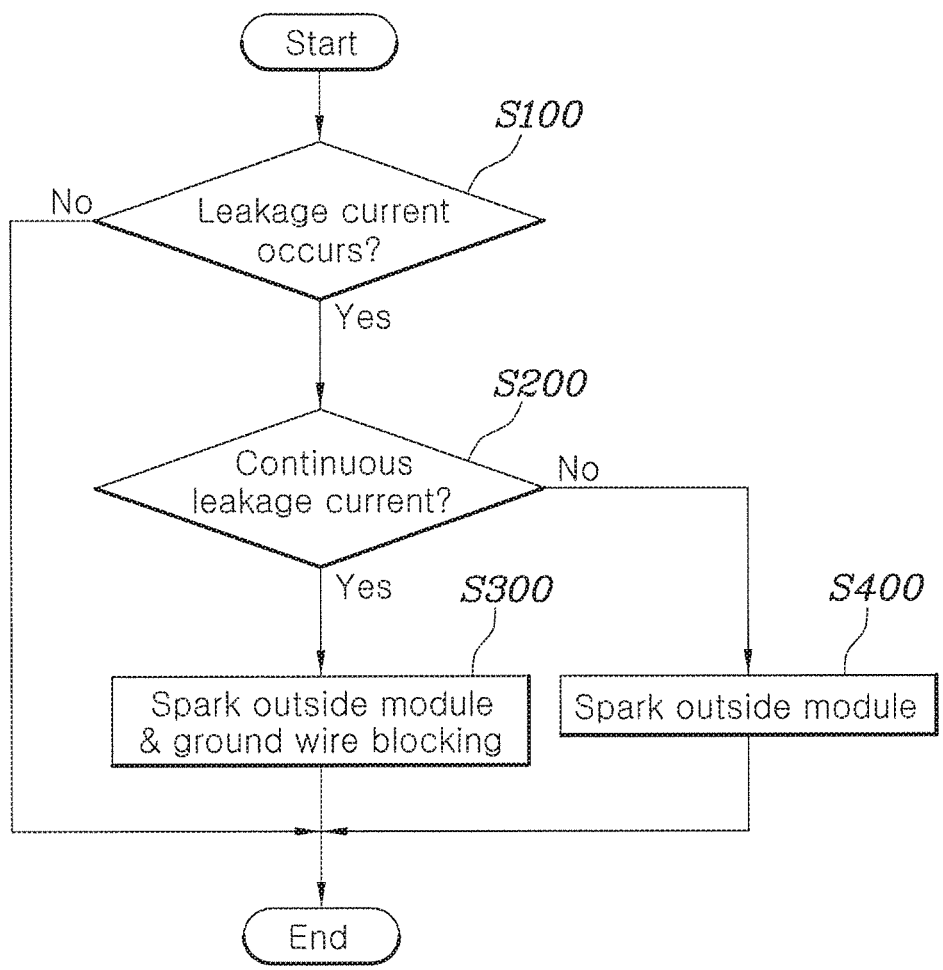
FIG. 5 illustrates an insulation method of the battery system according to an embodiment of the present disclosure.

FIG. 1 illustrates the configuration of a battery system according to an embodiment of the present disclosure. FIG. 2 illustrates a battery module of the battery system according to an embodiment of the present disclosure. FIG. 3 illustrates the configuration of a leakage current blocking device of the battery system according to an embodiment of the present disclosure. FIGS. 4A and 4B illustrate a spark induction chamber of the battery system according to an embodiment of the present disclosure. FIG. 5 illustrates an insulation method of the battery system according to an embodiment of the present disclosure.

Referring to FIG. 1 and FIG. 2, a battery system according to the present disclosure may include: a battery module 100; a cooling channel 200 disposed adjacent to the battery module 100; a ground wire 300 configured to electrically connect the cooling channel 200 and a vehicle body 30; and a leakage current blocking device 500 configured to interrupt an electrical connection formed by the ground wire 300 when a leakage current occurs in the battery module 100.

The battery module 100 includes a plurality of battery cells 110 and a cooling fin 150 disposed between the plurality of battery cells 110 to cool the battery cells 110. The cooling fin 150 is a metal conductor and is in contact with the battery cells 110. In order to give a surface pressure between the battery cells 110 of the battery module 100, a side of the outermost battery cell 110 inside the module is pressed by a metal conductor.

The cooling channel 200 is a metal conductor and may prevent static electricity in a state in which the cooling channel 200 is grounded with the vehicle body 30.

A Thermal Interface Material (TIM) between the battery module 100 and the cooling channel 200 is a thermal conduction material, conducts heat between the battery module 100 and the cooling channel 200, and has insulation performance. The TIM is designed to be as thin as possible in order to improve the effectiveness of a water-cooled type battery system and reduce the cost price thereof.

The leakage current blocking device 500 causes an electric spark to occur by the leakage current occurring in the battery module 100 and interrupts an electrical connection formed by the ground wire 300 on the basis of the number of times of the occurrence of the electric spark.

Here, the leakage current blocking device 500 draws a leakage current occurring at a point inside the battery module 100, which has insulation vulnerability, to the outside of the battery module 100 and causes an electric spark to occur, thereby discharging the leakage current. Further, a spark induction chamber 520 of the leakage current blocking device 500, described below, has a gas filled therein. When the number of times of the occurrence of an electric spark increases due to continuous occurrence of a leakage current, the volume of the gas in the spark induction chamber 520 expands. Therefore, the spark induction chamber 520 operates a switch 540, described below, by using the expansion force of the volume of the gas, thereby blocking the ground wire 300.

In relation to the configuration of the leakage current blocking device 500, the leakage current blocking device 500 may include: the spark induction chamber 520 having an inner space, in which the electric spark occurs, and having a piston 524 which moves by the expansion of a gas in the inner space; a switch 540 configured to be operated by the piston 524; and a relay 560 configured to determine an electrical connection state of the ground wire 300 according to an operation of the switch 540.

Here, the spark induction chamber 520 has an inner space, in which a leakage current occurring in the battery module 100 can be discharged in the form of a spark, and the piston 524 which moves by the expansion of a gas filled in the inner space. In an embodiment of the present disclosure, the inner space is illustrated to have a tetragonal frame shape, but the inner space may have various shapes. Further, the spark induction chamber 520 may have a gas filled therein, the volume of which increase by discharge energy.

Referring to FIG. 3, as an embodiment of the present disclosure, the piston 524 may protrude from the spark induction chamber 520 by an expansion force of the volume of a gas when the volume of the gas expands in a state in which a part of the piston 524 is inserted in the spark induction chamber 520.

The spark induction chamber 520 may include, in the inner space thereof, a first acicular structure electrically connected to one point inside the battery module 100 and a second acicular structure connected to another point inside the battery module 100.

Here, the spark induction chamber 520 is a device which induces a leakage current occurring in the battery module 100 to the outside of the battery module 100 and causes a spark to occur. The spark induction chamber 520 may be connected to multiple points inside the battery module 100 but may be connected between the battery cells 110 and a module cover's inner surface 130, which are points having insulation vulnerability in a water-cooled type battery system, or between the battery cells 110 and the cooling fin 150.

Specifically, as an embodiment, referring to FIG. 4A, the first acicular structure may be connected to a battery cell 110 inside the battery module 100, and the second acicular structure may be connected to an inner surface 130 of a cover of the battery module 100. As another embodiment, referring to FIG. 4B, the first acicular structure may be connected to a battery cell 110 inside the battery module 100 and the second acicular structure may be connected to a cooling fin 150 disposed between the battery cells 110 inside the battery module 100.

Referring to FIGS. 1 and 3, when the switch 540 is pressed by the piston 524 of the spark induction chamber 520, the switch 540 operates a relay 560 electrically connected thereto.

The relay 560 may be a B contact (normally ON) relay, and is disposed on the ground wire 300 for electrically connecting the cooling channel 200 and the vehicle body 30 and is turned on at the time of operation of the switch 540, so as to block the ground wire 300. Therefore, it is possible to ensure insulation performance even when a leakage current continuously occurs in the battery module 100 (conversely, when a leakage current does not continuously occur, there is an advantageous effect, such as the prevention of static electricity through the grounding of the cooling channel 200 to the vehicle body 30).

An operation flow of the present disclosure will be described with respect to FIG. 5. First, when a leakage current temporarily occurs in the battery module 100, an electric spark occurs in the spark induction chamber 520 of the leakage current blocking device 500 connected to the battery module 100 generates and thus causes the leakage current to be discharged threrethrough. When a leakage current continuously occurs, the number of times of the occurrence of an electric spark inside the spark induction chamber 520 increases and thus the volume of an inner gas expands to cause the switch 540 to be operated so as to block the ground wire 300 between the cooling channel 200 and the vehicle body 30. In summary, a temporary leakage current is discharged in the form of a spark inside the spark induction chamber 520, and, in relation to a continuous leakage current, a spark discharge inside the spark induction chamber 520 and the volume expansion of a gas by discharge energy may be used to block the ground wire 300 between the cooling channel 200 and the vehicle body 30, so that additional insulation safety can be ensured.

A battery system according to an embodiment of the present disclosure may include: a battery module 100; a cooling channel 200 disposed adjacent to the battery module 100; a ground wire 300 configured to electrically connect the cooling channel 200 and a vehicle body 30; and a leakage current blocking device 500 disposed outside the battery module 100 and having a first acicular structure and a second acicular structure, which are electrically connected to two points inside the battery module 100, respectively, wherein a leakage current between the two points inside the battery module 100 is configured to cause an electric spark to occur between the first and second acicular structures. The leakage current blocking device 500 may further include: a spark induction chamber 520 having an inner space, in which the first and second acicular structures 522 are arranged, and having a piston 524 which moves as a gas in the inner space expands due to the occurrence of an electric spark between the first and second acicular structures 522; a switch 540 configured to be operated by the piston 524; and a relay 560 configured to determine an electrical connection state of the ground wire 300 according to the operation of the switch 540.

Here, in relation to the two points inside of the battery module 100, to which the leakage current blocking device 500 is connected, as described above (see FIGS. 4A and 4B), the first acicular structure may be connected to a battery cell 110 inside the battery module 100 and the second acicular structure may be connected to an inner surface 130 of a cover of the battery module 100. Alternatively, the first acicular structure may be connected to battery cells 110 inside the battery module 100 and the second acicular structure may be connected to a cooling fin 150 disposed between the battery cells 110 inside the battery module 100.

As described above, the battery system according to various embodiments of the present disclosure can induce a spark to occur outside a module when a leakage current flows in a structure of a water-cooled type battery system having insulation vulnerability, and can disconnect a ground wire between a cooling channel and a vehicle body when the leakage current continuously occurs, so that the battery system has an improved insulation safety.

Further, the battery system can prevent the occurrence of a spark inside the module, thereby preventing cell sealing release, explosion, and fire.

Further, when a leakage current continuously occurs, the battery system can prevent the cooling channel and the vehicle body from being grounded, thereby improving insulation performance.

Further, the battery system can ensure insulation safety, thereby improving the merchantability of a vehicle.

The present disclosure has been illustrated and illustrated with reference to only the particular embodiments thereof. However, it would be obvious to a person skilled in the art that various modifications and changes are possible within the technical idea of the present disclosure, provided by the accompanying claims.

What is claimed is:

1. A battery system comprising:
   a battery module;
   a cooling channel disposed adjacent to the battery module;
   a ground wire electrically connecting the cooling channel and a vehicle body; and
   a leakage current blocking device configured to interrupt an electrical connection of the cooling channel and the vehicle body when a leakage current occurs in the battery module,
   wherein the leakage current blocking device causes an electric spark to occur by the leakage current occurring in the battery module and interrupts the electrical connection based on a number of times of the occurrence of the electric spark.

2. The battery system of claim 1, wherein the leakage current blocking device comprises:
   a spark induction chamber having an inner space, in which the electric spark occurs, and having a piston which moves by the expansion of a gas in the inner space of the spark induction chamber,
   a switch configured to be operated by the piston; and
   a relay configured to determine an electrical connection state of the ground wire according to an operation of the switch.

3. The battery system of claim 2, wherein the spark induction chamber comprises, in the inner space thereof:

a first acicular structure electrically connected to one point inside the battery module; and a second acicular structure connected to another point inside the battery module.

4. The battery system of claim 3, wherein the first acicular structure is connected to a battery cell inside the battery module, and wherein the second acicular structure is connected to an inner surface of a cover of the battery module.

5. The battery system of claim 3, wherein the first acicular structure is connected to a battery cell inside the battery module, and wherein the second acicular structure is connected to a cooling fin disposed between battery cells inside the battery module.

6. A battery system comprising:

a battery module;

a cooling channel disposed adjacent to the battery module;

a ground wire electrically connecting the cooling channel and a vehicle body, and a leakage current blocking device disposed outside the battery module and having a first acicular structure and a second acicular structure, which are electrically connected to two points inside the battery module, respectively, wherein a leakage current between the two points inside the battery module is configured to cause an electric spark to occur between the first and second acicular structures.

7. The battery system of claim 6, wherein the first acicular structure is connected to a battery cell inside the battery module, and wherein the second acicular structure is connected to an inner surface of a cover of the battery module.

8. The battery system of claim 6, wherein the first acicular structure is connected to a battery cell inside the battery module, and wherein the second acicular structure is connected to a cooling fin disposed between battery cells inside the battery module.

9. The battery system of claim 6, wherein the leakage current blocking device further comprises:

a spark induction chamber having an inner space, in which the first and second acicular structures are arranged, and having a piston which moves as a gas in the inner space expands due to the occurrence of an electric spark between the first and second acicular structures;

a switch configured to be operated by the piston; and a relay configured to determine an electrical connection state of the ground wire according to the operation of the switch.

* * * * *